United States Patent Office 3,440,289
Patented Apr. 22, 1969

3,440,289
PROCESS FOR PREPARING 6-ALKOXY-METHYL-2,4-DINITROPHENOLS
Andrew C. Hazy, New Haven, and Joseph V. Karabinos, Orange, Conn., assignors to Olin Mathieson Chemical Corporation
No Drawing. Filed Feb. 10, 1966, Ser. No. 526,404
Int. Cl. C07c 37/16, 39/16, 39/18
U.S. Cl. 260—611
10 Claims

ABSTRACT OF THE DISCLOSURE 6-substituted-methyl-2,4-dinitrophenols are formed by heating a mixture of 6,8-dinitro - 1,3 - benzodioxane, an alkanol and an acid catalyst and separating the resulting dinitrophenol from the reaction mixture.

This invention relates to an improved process for preparing 6-substituted-methyl-2,4-dinitrophenols. More particularly the substituted 2,4-dinitrophenols prepared by the process of this invention have the formula

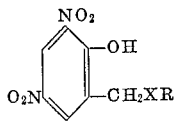

where X is oxygen or sulfur and R is alkyl, cycloalkyl, alkenyl, aralkyl, hydroxyalkyl and hydroxycycloalkyl of 1 to 12 carbons. Examples of the substituted 2,4-dinitrophenols prepared by the process of this invention include:

Alkyl 6-methoxymethyl-2,4-dinitrophenol
6-ethoxymethyl-2,4-dinitrophenol
6-isopropoxymethyl-2,4-dinitrophenol
6-isoamyloxymethyl-2,4-dinitrophenol
6-n-hexyloxymethyl-2,4-dinitrophenol
6-dodecyloxymethyl-2,4-dinitrophenol Cycloalkyl 6-cyclobutyloxymethyl-2,4-dinitrophenol
6-cyclohexyloxymethyl-2,4-dinitrophenol Alkenyl 6-allyloxymethyl-2,4-dinitrophenol
6-crotonyloxymethyl-2,4-dinitrophenol Aralkyl 6-benzyloxymethyl-2,4-dinitrophenol
6-p-nitrobenzyloxymethyl-2,4-dinitrophenol
6-o-chlorobenzyloxymethyl-2,4-dinitrophenol
6-m-ethylbenzyloxymethyl-2,4-dinitrophenol
6-phenethyloxymethyl-2,4-dinitrophenol Hydroxyalkyl 6-hydroxyethoxymethyl-2,4-dinitrophenol
6-hydroxypropoxymethyl-2,4-dinitrophenol Hydroxycycloalkyl 6 - (2',2',4',4' - tetramethyl-3'-hydroxy-1'-cyclobutyloxymethyl)-2,4-dinitrophenol French Patent 1,403,658 delivered May 17, 1965 and Indian specification 91,371 of 1963 describe many of these compounds, among others, and disclose their pesticidal properties. The process of the French and Indian specifications for making compounds of the above formula consists of three steps starting from 6,8-dinitro-1,3-benzodioxane having the formula

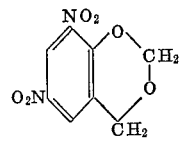

This invention relates to an improved process for preparing 2,4-dinitrophenols of the formula given first above in only one step starting from the same 6,8-dinitro-1,3-benzodioxane. The process of this invention consists broadly in the reaction of the said benzodioxane with an alcohol or other appropriate reactant in the presence of minor amounts of an acid catalyst. Generally the process of this invention comprises heating at 100 to 160° C. for at least one hour an initial mixture of 6,8-dinitro-1,3-benzodioxane, 1 to 50 moles per mole of said benzodioxane of a compound of the formula RXH where R and X are as defined above and from 0.001 to 10% by weight based on the weight of said benzodioxane, of an acid catalyst to form a reaction mixture containing said dinitrophenol and separating said dinitrophenol from said reaction mixture.

In general, the reaction is carried out at temperatures between about 100 and 160° C., preferably 130 to 150° C. When lower aliphatic alcohols having boiling points below 100° C. are used, the reaction is appropriately carried out under autogenous pressure in order to elevate the temperature in the liquid phase to at least 100° C. When 6,8-dinitro-1,3-benzodioxane was treated at atmospheric pressure with ethanol in the presence of aluminum chloride and the mixture was refluxed for 48 hours, 6-ethoxymethyl-2,4-dinitrophenol was obtained at 4% conversion and 15% yield. The same reactants in the same propertion at 130° C. under 41 p.s.i.g. after four hours gave a 67% conversion to the same product.

Stoichiometric proportions of the dinitrobenzodioxane and alcohol in a molar ratio of 1:1 can be used but for improved yields in shorter time an excess of alcohol is used. The molar proportion of alcohol to benzodioxane can be from 1:1 to 50:1 or more.

As acid catalyst in the process of this invention, a wide variety of acids are suitable. Anhydrous protonic acids are suitable, including both inorganic and organic acids. Examples include hydrogen chloride, sulfuric acid, phosphoric acid, hydrogen fluoride, boric acid and p-toluenesulfonic acid.

Any of the Lewis type acids which are known to be active in Friedel-Crafts type reactions are suitable as catalysts in the practice of this invention. Suitable catalysts of this nature are listed, for example, by G. Olah in "Friedel-Crafts and Related Reactions," published by Interscience Publications, 1963–64. Included are $BF_3$ and its etherate, $AlCl_3$, $Al(C_2H_5)Cl_2$, $AlBr_3$, $FeCl_3$, $SnCl_4$, $TiCl_4$, $ZnCl_2$ and $ZnBr_2$.

Heterogeneous acids including acidic clays for example, fuller's earth and acidic ion exchange resins are also suitably employed in the process of this invention.

The proportion of catalyst suitably ranges from 0.001 to 10% by weight based on the weight of the dinitrobenzodioxane.

Although the process of this invention is preferably performed without solvents other than the excess alcohol, insert solvents are suitably used when desired. Suitable inert solvents are particularly hydrocarbons and halohydrocarbons, for example, petroleum ether, hexane, benzene, xylene and chlorobenzene.

At temperatures above 100° C. a reaction time of 1 to 24 hours is usually sufficient but longer times do not adversely affect yields.

The dinitrophenol products are generally difficultly soluble in water but soluble in lower aliphatic alcohols. The reaction mixture is suitably taken up in alcohol, water is added to incipient precipitation and, on cooling and standing, the product crystallizes. It is suitably recrystallized from alcohol or other suitable solvent.

Example I

A 300 ml. stainless steel microshaker autoclave was charged with 22.6 g. (0.10 mole) of 6,8-dinitro-1,3-benzodioxane and 200 ml. (5.0 moles) of absolute methanol. The vessel was purged with nitrogen and 1.0 ml. of boron trifluoride etherate was added. The mixture was heated to 140° C. for 3 hours with shaking. The reaction mixture was chilled and water was added. The precipitated solid was dissolved in 200 ml. of boiling methanol, treated with decolorizing charcoal and the mixture was filtered. The yellow filtrate was treated with water and chilled. Yellow platelets of 6-methoxymethyl-2,4-dinitrophenol crystallized out. Yield was 19.1 g. or 84% of theory. M.P. 63–64° C. Analysis for $C_8H_8N_2O_6$.—Calcd.: C, 42.11%; H, 3.53%; N, 12.28%. Found: C, 42.18%; H, 3.55%; N, 12.41%.

Example II

A mixture of 22.6 g. (0.10 mole) of 6,8-dinitro-1,3-benzodioxane, 200 ml. (2.2 moles) of 2-butanol and 1.0 ml. of boron trifluoride etherate was stirred and refluxed for 68 hours. The mixture was filtered hot and the filtrate was cooled to room temperature. Separated solid was filtered and extracted with 200 ml. of absolute methanol, adding the extract to the first filtrate. The mixture was cooled and water was added to incipient precipitation. The solid which crystallized out on standing was filtered and recrystallized from aqueous ethanol to give 22.5 g. (83%) of 6-(sec-butoxymethyl)-2,4-dinitrophenol. Analysis for $C_{11}H_{14}N_2O_6$.—Calcd.: C, 48.86%; H, 5.22%; N, 10.41%. Found: C, 49.19%; H, 5.23%; N, 10.65%.

Example III

A mixture of 22.6 g. (0.10 mole) of 6,8-dinitro-1,3-benzodioxane, 80 ml. (0.65 mole) of 2-ethyl-1-butanol and 1.0 ml. of boron trifluoride etherate was stirred and heated to 140° C. for 10 hours. The mixture was cooled to room temperature and filtered. Separated solid was dissolved in methanol and this methanolic solution was added to the filtrate. The resulting solution was chilled and water was added to induce crystallization. The separated solid was dissolved in methanol and decolorized with charcoal. The resulting yellow solution was chilled and treated with water to yield 10.7 g. of 6-(2'-ethylbutoxymethyl)-2,4-dinitrophenol, M.P. 43–44° C. Analysis for $C_{13}H_{18}N_2O_6$.—Calcd.: C, 52.34%; H, 6.08%; N, 9.39%. Found: C, 52.55%; H, 6.15%; N, 9.49%.

Example IV

A mixture of 22.6 g. (0.10 mole) of 6,8-dinitro-1,3-benzodioxane, 200 ml. (1.0 mole) of cyclohexanol and 1.0 ml. of boron trifluoride etherate was stirred and heated to 130° C. for 6½ hours. The reaction mixture was cooled and filtered. The filtrate was dissolved in methanol and water was added until the solution became turbid. Chilling caused crystallization to occur. The solid was filtered and recrystallized from methanol-petroleum ether to give 20.7 g. (70%) of 6-cyclohexyloxymethyl-2,4-dinitrophenol. Analysis for $C_{13}H_{16}N_2O_6$. Calcd.: C, 52.67%; H, 5.44%; N, 9.50%. Found: C, 52.93%; H, 5.46%; N, 9.52%.

Example V

A mixture of 22.6 g. (0.10 mole) of 6,8-dinitro-1,3-benzodioxane and 100 g. (0.695 mole) of cis-trans-2,2,4,4-tetramethyl-1,3-cyclobutanediol was melted and maintained at 135° C. while 1.0 ml. of boron trifluoride etherate was added. The melt was heated at 110° C. for 6 hours, then cooled to room temperature. The resulting solid was dissolved in 300 ml. of methanol and filtered. The filtrate was evaporated to remove the methanol and the residue was dissolved in 200 ml. of 1 M sodium hydroxide solution. The alkaline solution was decolorized by three charcoal treatments and the red solution was acidified with 100 ml. of 6 N hydrochloric acid. Separated solid was filtered, dissolved in methanol and water was added to turbidity. On chilling overnight, a tan solid crystallized out. Recrystallization from aqueous methanol gave 6-(2',2',4',4'-tetramethyl-3'-hydroxy-1' - cyclobutyloxymethyl)-2,4-dinitrophenol, M.P. 105–108° C. Analysis for $C_{15}H_{20}N_2O_7$.—Calcd.: C, 52.96%; H, 5.88%; N, 8.24%. Found: C, 53.15%; H, 6.02%; N, 8.65%.

Example VI

A mixture of 22.6 g. (0.10 mole) of 6,8-dinitro-1,3-benzodioxane, 150 ml. (1.45 moles) of benzyl alcohol and 1.0 ml. of boron trifluoride etherate was stirred and heated at 108–130° C. for 48 hours. The reaction mixture was filtered and the filtrate was extracted with two 100 ml. portions of 1 M sodium hydroxide solution. The alkaline solution was chilled and acidified with 50 ml. of 12 M hydrochloric acid. The resulting oil solidified and was twice recrystallized from absolute methanol to give 16.4 g. (54%) of 6-benzyloxymethyl-2,4-dinitrophenol. Analysis for $C_{14}H_{12}N_2O_6$.—Calcd.: C, 55.24%; H, 3.97%; N, 9.25%. Found: C, 55.42%; H, 4.06%; N, 9.14%.

Example VII

A 300 ml. stainless steel microshaker autoclave was charged with 200 ml. (2.95 moles) of allyl alcohol, 22.6 g. (0.10 mole) of 6,8-dinitro-1,3-benzodioxane and 1.0 ml. of boron trifluoride etherate. The mixture was shaken at 140° C. for 3 hours. The reaction mixture was chilled and treated with 300 ml. of water. The oil which formed was redissolved by the addition of methanol and the solution was decolorized by three treatments with activated charcoal. The solution was chilled and the resulting yellow crystals were filtered. Recrystallization from aqueous methanol gave a 55% yield of 6-allyloxymethyl-2,4-dinitrophenol, M.P. 45–46° C. Analysis for $C_{10}H_{10}N_2O_6$.—Calcd.: C, 47.25%; H, 3.96%; N, 11.02%. Found: C, 47.30%; H, 4.17%; N, 11.03%.

Example VIII

A mixture of 22.6 g. (0.10 mole) of 6,8-dinitro-1,3-benzodioxane, 25 ml. (0.214 mole) of benzyl mercaptan, 225 ml. of xylene and 1.0 ml. of boron trifluoride etherate was stirred and heated to 140° C. for 24 hours. The reaction mixture was cooled, filtered and the filtrate was extracted with three 100 ml. portions of 1 M sodium hydroxide. The aqueous extract was chilled and acidified to a pH of 2 with 6 N hydrochloric acid. The oil which formed was dissolved in boiling methanol, treated with decolorizing charcoal and filtered. The red filtrate was chilled and water was added to precipitate the resulting 6-benzylthiomethyl-2,4-dinitrophenol, M.P. 127–129° C. Analysis for $C_{14}H_{12}N_2O_5S$.—Calcd.: C, 52.47%; H, 3.77%; N, 8.79%; S, 10.01%. Found: C, 52.95%, H, 4.00%; N, 8.94%; S, 10.31%.

Example IX

A mixture of 4.5 g. (0.02 mole) of 6,8-dinitro-1,3-benzodioxane, 40 ml. (0.44 mole) of 1-butanol and 0.2 g. of catalyst was stirred under reflux for 24 hours. The clear solution was chilled and water was added until two layers resulted. Just sufficient methanol was then added to obtain homogeneity. The product crystallized from this clear solution on standing and was filtered, washed and dried. The catalysts shown in the following table gave the indicated yields of 6-n-butoxymethyl-2,4-dinitrophenol.

| Catalyst | Yield, percent |
|---|---|
| Boron trifluoride etherate | 68 |
| Aluminum chloride | 70 |
| Zinc chloride | 83 |
| Stannic chloride (1 ml.) | 74 |
| Bismuth chloride | 41 |
| Ferric chloride | 59 |
| Mercuric chloride | 70 |
| Boric acid | 72 |
| Sulfuric acid | 78 |
| Zinc Iodide | 72 |

What is claimed is:

1. Process for preparing 6-substituted-methyl 2,4-dinitrophenols having the formula

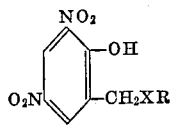

where X is oxygen and R is alkyl, cycloalkyl, alkenyl, aralkyl, hydroxylalkyl and hydroxycycloalkyl of 1 to 12 carbons which comprises heating at 100 to 160° C. for at least one hour an initial mixture of 6,8-dinitro-1,3-benzodioxane, 1 to 50 moles per mole of said benzodioxane of a compound of the formula RXH where R and X are as defined above and from 0.001 to 10% by weight based on the weight of said benzodioxane, of an acid catalyst selected from the group consisting of a protonic acid and a Lewis acid to form a reaction mixture containing said dinitrophenol and separating said dinitrophenol from said reaction mixture.

2. Process as claimed in claim 1 in which said RXH is selected from the group consisting of methanol, 2-butanol, 2-ethyl-1-butanol, cyclohexanol, cis-trans-2,2,4,4-tetramethyl-1,3-cyclobutanediol, benzyl alcohol, allyl alcohol and 1-butanol.

3. Process as claimed in claim 1 in which said reaction mixture is dissolved in a water-immiscible alcohol and water is added to crystallize and dinitrophenol product.

4. Process as claimed in claim 1 in which said mixture is maintained under autogenous pressure.

5. Process as claimed in claim 1 in which an inert solvent is added to said initial mixture.

6. Process as claimed in claim 1 in which said acid catalyst is a Lewis acid.

7. Process as claimed in claim 6 in which said Lewis acid is aluminum chloride.

8. Process as claimed in claim 6 in which said Lewis acid is zinc chloride.

9. Process as claimed in claim 6 in which said Lewis acid is boron trifluoride etherate.

10. Process as claimed in claim 6 in which said Lewis acid is sulfuric acid.

References Cited

FOREIGN PATENTS 1,403,658  5/1967  France.

CHARLES B. PARKER, *Primary Examiner.*

D. R. PHILLIPS, *Assistant Examiner.*

PO-1050
(5/69)

UNITED STATES PATENT OFFICE
CERTIFICATE OF CORRECTION

Patent No. 3,440,289          Dated April 22, 1969

Inventor(s)  Andrew C. Hazy and Joseph V. Karabinos

It is certified that error appears in the above-identified patent and that said Letters Patent are hereby corrected as shown below:

Column 2, line 57, "Albr$_3$" should read --AlBr$_3$--.

Column 6, line 12, "and" should read --said--.

SIGNED AND
SEALED

NOV 4 1969

(SEAL)
Attest:

Edward M. Fletcher, Jr.
Attesting Officer

WILLIAM E. SCHUYLER, JR.
Commissioner of Patents